Nov. 8, 1949     H. C. TYSON     2,487,496
COMBINATION TRAILER HITCH AND BUMPER GUARD
Filed Feb. 19, 1947
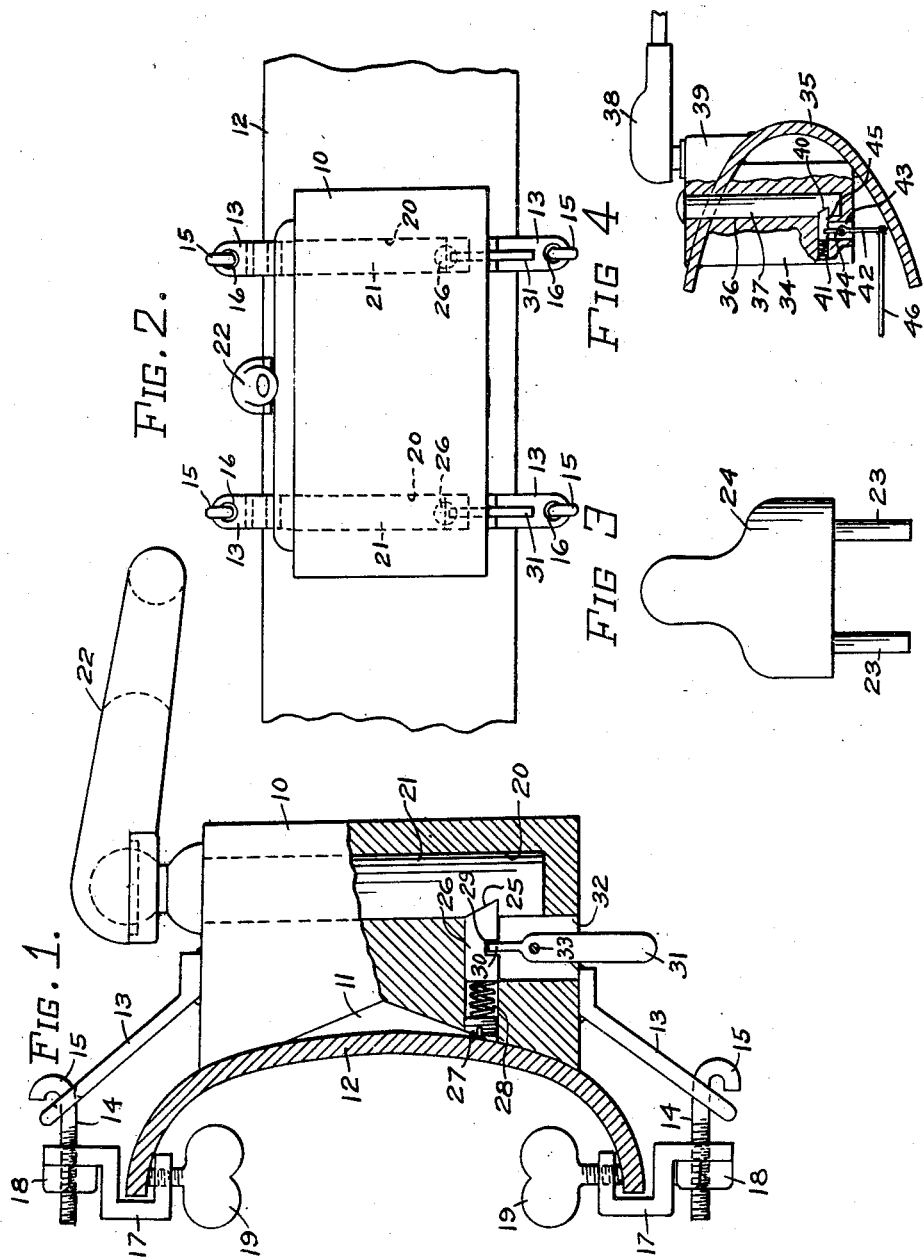
INVENTOR.
HOMER C. TYSON
ATTORNEYS Patented Nov. 8, 1949

2,487,496

UNITED STATES PATENT OFFICE 2,487,496

COMBINATION TRAILER HITCH AND BUMPER GUARD

Homer C. Tyson, Bethany, Ohio

Application February 19, 1947, Serial No. 729,442

1 Claim. (Cl. 280—33.44)

This invention relates to a combination trailer hitch and bumper guard.

An object of this invention is to provide a device that can be used as a trailer hitch and when not so used will constitute a bumper guard.

Another object of the invention is to provide a device that is simple in construction and operation, durable and efficient in use, and can be inexpensively manufactured for the purpose desired.

With the above and other objects in view, the invention consists of the novel details of construction, arrangement and combination of parts more fully hereinafter described, claimed and illustrated in the accompanying drawing in which:

Figure 1 is a side elevational view partly in section of an embodiment of the invention;

Figure 2 is a front view thereof;

Figure 3 is a front view of the removable bumper guard and

Figure 4 is a modified form of the invention.

Referring more in detail to the drawing, the invention comprises a rectangular shaped body or block 10 having a tapered recess 11 in the rear thereof to conform somewhat to the shape of the bumper 12 on which it is mounted.

Such mounting is accomplished by angular brackets 13 secured to the top and bottom of the block 10 adjacent each outer end thereof. Screws 14 have hooked ends 15 which are inserted in openings 16 in the brackets 13, and mounted in hooked shaped brackets 17 by means of nuts 18, will, when the nuts are tightened firmly mount the block 10 on the bumper 12. Winged screws 19 in the brackets 17 further aid in retaining the brackets on the bumpers.

The block 10 is provided with vertical bores 20 adjacent each outer end thereof in alinement with each other, and with the brackets 13, and these bores are adapted to receive the dowels 21 of the trailer hitch 22 when it is in use, or the dowels 23 of the bumper guard 24 which is used when the trailer hitch is removed.

The dowels 21 and 23 are provided with notches 25 in the rear surface thereof to be engaged by the spring press latch 26 which is mounted in the block 10, and an adjustable screw 27 tensions the spring 28 of the latch 26.

The latch 26 is provided in its lower surface with a notch 29 which is engaged by the end 30 of the lever 31, which is pivotedly mounted in the recess 32 in the block 10 of a pin 33. Pulling the lever 31 forward retracts the latch 26 so that the hitch 22 or guard 24 can be removed and replaced as desired.

In Figure 4 the block 34 is mounted within the bumper 35 and contoured at the top and bottom thereof to conform somewhat to the shape of the bumper 35.

The block 34 is also provided with vertical bores 36 to receive the dowel 37 of the trailer hitch 38 which is mounted on a block 39 which rests on the bumper 35, the dowel 37 passing through the bumper as shown. The dowel 37 is notched at 40 to receive the spring pressed latch 41, and the lever 42 pivoted at 43 in the recess 44 in the block 34 enters the notch 45 in the latch 41, and a rod or cord 46 connected to the lever 42 can be pulled to release the latch as desired.

In both forms, one can be removably attached to a bumper while the other can be permanently fixed thereto.

In either form, the hitch can be mounted on the block for towing a trailer or the hitch can be removed, and the bumper guard mounted to prevent the appearance of a conventional bumper guard.

There has thus been provided a simple and efficient combined bumper guard and trailer hitch, and it is believed that from the foregoing description, the operation and construction of the invention will be apparent to those skilled in the art. It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, comprising a block, adapted to be mounted on the bumper of an automobile, the rear of the block being tapered to conform somewhat to the shape of the bumper, angular brackets fixed at the top and bottom of said block, hook shaped brackets adapted to engage the top and bottom edges of the bumper and hook shaped screw bolts connecting the angular brackets to the hook shaped brackets vertical openings in the block adapted to receive pins of a hitch or bumper guard, notches in the lower ends of said pins, spring pressed latches carried by said block for engaging the notches in the pins to lock them in the block, a groove in the lower face of said latch, a pivoted lever in said block having the upper end thereof engageable in the groove in the latch and adapted to retract and thus release said latch to permit removal of the pins from said block.

HOMER C. TYSON.

REFERENCES CITED

The following references are of record in the file of this patent:

UNITED STATES PATENTS

| Number | Name | Date |
|---|---|---|
| 2,062,788 | Jacob | Dec. 1, 1936 |
| 2,342,907 | Stall | Feb. 29, 1944 |